United States Patent [19]

Hirata et al.

[11] Patent Number: 4,486,378
[45] Date of Patent: Dec. 4, 1984

[54] PLASTIC BOTTLES AND PROCESS FOR PREPARATION THEREOF

[75] Inventors: Sadao Hirata, Yokohama; Isao Tanikawa, Ayase; Yoshitsugu Maruhashi, Yokohama, all of Japan

[73] Assignee: Toyo Seikan Kaisha Ltd., Tokyo, Japan

[21] Appl. No.: 598,543

[22] Filed: Apr. 12, 1984

Related U.S. Application Data

[60] Continuation of Ser. No. 386,039, Jun. 7, 1982, abandoned, which is a division of Ser. No. 258,772, Apr. 29, 1981, Pat. No. 4,370,368.

[30] Foreign Application Priority Data

May 7, 1980 [JP]  Japan .................................. 55-59505
May 7, 1980 [JP]  Japan .................................. 55-59506

[51] Int. Cl.$^3$ .............................................. B29D 9/04
[52] U.S. Cl. .................................. 264/512; 264/134; 264/235; 264/516
[58] Field of Search ............... 215/1 C, 12 R; 428/35; 264/134, 513, 516, 512

[56] References Cited

U.S. PATENT DOCUMENTS 3,449,479  6/1969  Cines .
3,804,663  4/1974  Clark .......................... 215/1 C
3,922,451  11/1975  Anschutz et al. .
4,379,099  4/1983  Ota et al. ........................ 264/235

*Primary Examiner*—James J. Bell
*Attorney, Agent, or Firm*—Sherman & Shalloway

[57] ABSTRACT

A plastic bottle has as a wall-forming component a layer of a copolymer consisting essentially of 99 to 70% by weight of vinylidene cloride and 1 to 40% by weight of at least one acrylic or methacrylic monomer and further including up to 100 parts by weight of at least one member selected from other ethylenically unsaturated monomers per 100 parts by weight of the total amount of the first two monomers, the copolymer having an oxygen permeability constant of less than $9 \times 10^{-14}$ cc·cm/cm$^2$·sec·cmHg as measured at a temperature of 20° C. and a relative humidity of 100% and a water vapor permeability constant of less than $3 \times 10^{-3}$ g·cm/m$^2$·day as determined according to the method of JIS Z-0208.

This plastic bottle is obtained by casting an aqueous latex or the like of the above-mentioned copolymer in a bottle mold and drying the cast latex. This aqueous latex may be formed as a coating layer on a preformed plastic bottle. In this plastic bottle, the humidity dependency of the oxygen barrier property is prominently reduced.

9 Claims, 5 Drawing Figures

PLASTIC BOTTLES AND PROCESS FOR PREPARATION THEREOF

This is a continuation of application Ser. No. 386,039, filed June 7, 1982 which in turn is a division of application Ser. No. 258,772 filed Apr. 29, 1981, now issued as U.S. Pat. No. 4,370,368.

BACKGROUND OF THE INVENTION

1. Field of the Invention

The present invention relates to a plastic bottle and a process for the preparation thereof. More particularly, the present invention relates to a plastic bottle excellent in the barrier property to gases such as nitrogen, carbon dioxide gas, oxygen and steam, especially in the combination of the oxygen barrier property and moisture resistance, in which the humidity dependency of the oxygen barrier property is prominently reduced, and a process for the preparation of such plastic bottles.

2. Description of the Prior Art

Plastic bottles prepared by melt-extruding and hollow-molding (blow-molding) thermoplastic plastics such as polyolefins are used in various fields instead of glass bottles because the plastic bottles have a lighter weight and a better shock resistance than the glass bottles.

General-purpose plastics such as polyolefins are excellent in the moisture resistance and sanitary characteristics, but the oxygen permeability constant is relatively high and in bottles of these plastics, permeation of oxygen through bottle walls is not negligible. Accordingly, bottles of general-purpose plastics are not suitable as vessels for preserving foods for a long time or as vessels for cosmetics and the like where a high flavor-retaining property is required.

As bottles in which this defect is overcome, there have been developed and proposed plastic bottles having a wall structure excellent in the oxygen barrier property. Among melt-extrudable thermoplastic resins which are now available, a saponified ethylene/vinyl acetate copolymer (ethylene/vinyl alcohol copolymer) is most excellent in the oxygen barrier property. However, this saponified copolymer is inferior in the moisture resistance, that is, the steam barrier property, and in this saponified copolymer, the oxygen permeability constant tends to increase as increase of the humidity. Accordingly, when this saponified copolymer is actually used for formation of plastic bottles, it is necessary to adopt a troublesome molding method in which this saponified copolymer is sandwiched by moisture-resistant resins such as polyolefins and the resulting laminate is fed to the molding step.

SUMMARY OF THE INVENTION

We succeeded in preparing plastic bottles comprising as a wall-forming component a copolymer comprising 99 to 70% by weight of vinylidene chloride and 1 to 30% by weight of at least one acrylic or methacrylic monomer and further including up to 100 parts by weight of other ethylenically unsaturated monomer per 100 parts by weight of the sum of the amounts of said two monomers, and we found that these plastic bottles are prominently excellent in the combination of the oxygen barrier property and the moisture resistance, the humidity dependency of the oxygen barrier property is remarkably reduced in these plastic bottles and the content-preserving and flavor-retaining characteristics can be highly improved.

We also found that when the above-mentioned copolymer is formed as a coating layer on at least one of inner and outer surfaces of a plastic bottle formed by melt-molding of a thermoplastic resin, even if the thickness of the coating layer is considerably small, the barrier property of the bottle to gases such as oxygen and carbon dioxide gas, especially the combination of the oxygen barrier property and the moisture resistance, is highly improved and the tendency of the oxygen barrier property to decrease with increase of the humidity is eliminated and that plastic bottles prominently excellent in the content-preserving and flavor-retaining characteristics can easily be obtained according to the above process.

It is therefore a primary object of the present invention to provide a plastic bottle excellent in the combination of the oxygen barrier property and the moisture resistance, in which the humidity dependency of the oxygen barrier property is prominently reduced and a process for the preparation of such plastic bottles.

Another object of the present invention is to provide a plastic bottle comprising as a wall-forming component a copolymer comprising a major amount of vinylidene chloride and a minor amount of an acrylic or methacrylic monomer as indispensable monomer components and a process for the preparation of such plastic bottles.

Still another object of the present invention is to provide a plastic bottle in which the content-preserving property is guaranteed with a wall thickness smaller than in conventional plastics, whereby the bottle weight is decreased, the amount of the resin used for one bottle is reduced and the heat conductivity is improved, and a process for the preparation of such plastic bottles.

A further object of the present invention is to provide a plastic bottle comprising a plastic bottle substrate imparting good form-retaining property and mechanical strength necessary for a bottle and a coating layer imparting good oxygen barrier property and steam barrier property to the bottle, which is excellent in the adhesion to the substrate, and a process for the preparation of such plastic bottles.

In accordance with one fundamental aspect of the present invention, there is provided a plastic bottle comprising as a wall-forming component a layer of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers, said copolymer having an oxygen permeability constant of less than $9 \times 10^{-14}$ cc·cm/cm$^2$·sec·cmHg as measured at a temperature of 20° C. and a relative humidity of 100% and a water vapor permeability constant of less than $3 \times 10^{-3}$ g·cm/m$^2$·day as determined according to the method of JIS Z-0208.

In accordance with another fundamental aspect of the present invention, there is provided a plastic bottle comprising a plastic bottle substrate formed of a melt-moldable thermoplastic resin and a coating layer consisting susbstantially of said copolymer, which is formed on at least one surface of said plastic bottle substrate.

In accordance with still another fundamental aspect of the present invention, there is provided a process for preparing such plastic bottles by using an aqueous latex of said copolymer.

DETAILED DESCRIPTION OF THE PREFERRED EMBODIMENTS

Figure 1:
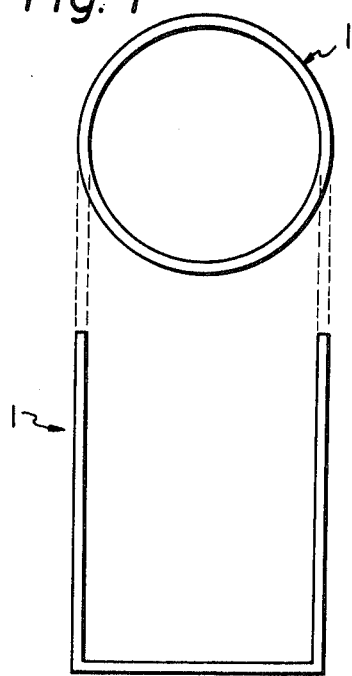
FIG. 1 is a diagram illustrating a shell (female mold) to be used in the process of the present invention.

The polymer that is used as the wall-forming component in the present invention comprises as indispensable components 99 to 70% by weight, preferably 96 to 75% by weight, of vinylidene chloride and 1 to 30% by weight, preferably 4 to 25% by weight of at least one acrylic or methacrylic monomer, and as an optional component, other ethylenically unsaturated monomer in an amount of up to 100 parts by weight, preferably 50 parts by weight, per 100 parts by weight of the total amount of said two indispensable monomers.

Acrylic acid, methacrylic acid or derivatives thereof may be used as the acrylic or methacrylic monomer in the present invention. As preferred monomers, there can be mentioned monomers represented by the following formula:

wherein $R_1$ stands for a hydrogen atom, a halogen atom or a methyl group, and X stands for a nitrile group ($-C\equiv N$) or a group

in which Y stands for an amino group, a hydroxyl group, alkyloxy group, a cycloalkyloxy group, an aminoalkyloxy group, a hydroxyalkyloxy group, an alkoxyalkyloxy group, a haloalkyloxy group, a glycidyl group, an aryloxy group or an aralkyloxy group.

More specifically, there can be mentioned acrylic acid, acrylonitrile, acrylamide, methyl acrylate, ethyl acrylate, methyl α-chloroacrylate, propyl acrylate, butyl acrylate, hexyl acrylate, octyl acrylate, cyclohexyl acrylate, glycidyl acrylate, 2-hydroxyethyl acrylate, acrylic monoglyceride, phenyl acrylate, methacrylic acid, methacrylonitrile, methacrylamide, methyl methacrylate, amyl methacrylate, glycidyl methacrylate, methacrylic monoglyceride, 2-hydroxypropyl methacrylate, β-methoxyethyl methacrylate, β-aminoethyl methacrylate and γ-N,N-diethylaminopropyl methacrylate.

These acrylic and methacrylic monomers may be used singly or in the form of a mixture of two or more of them. As the acrylic or methacrylic monomer that is especially suitable for attaining the objects of the present invention, there can be mentioned (i) a nitrile monomer such as acrylonitrile, methacrylonitrile or α-chloroacrylonitrile, (ii) an ester monomer such as methyl acrylate, ethyl acrylate, methyl methacrylate, 2-hydroxyethyl methacrylate, glycidyl acrylate, glycidyl methacrylate, acrylic monoglyceride, methacrylic monoglyceride, methoxyethyl acrylate or methoxyethylmethyl methacrylate, and (iii) a mixture of the monomers (i) and (ii).

As the ethylenically unsaturated monomer other than vinylidene chloride and the acrylic or methacrylic monomer, there can be mentioned, for example, vinyl aromatic monomers such as styrene and vinyl toluene, vinyl esters such as vinyl acetate and vinyl propionate, diolefins such as butadiene and isoprene, and methylvinyl ether, glycidylallyl ether, vinyl chloride, trichloroethylene, tetrachloroethylene, vinyl fluoride, difluoroethylene, trifluoroethylene, tetrafluoroethylene, maleic anhydride, fumaric acid, vinyl succinimide and vinyl pyrrolidone. These monomers may be used singly in the form of two or more of them.

Preferred copolymers are described below though copolymers that can be used in the present invention are not limited to those exemplified below.

Vinylidene/acrylonitrile copolymer, vinylidene/acrylonitrile/methacrylonitrile copolymer, vinylidene chloride/methacrylonitrile copolymer, vinylidene chloride/acrylonitrile/glycidyl acrylate copolymer, vinylidene chloride/acrylonitrile/glycidyl methacrylate copolymer, vinylidene chloride/acrylonitrile/acrylic monoglyceride copolymer, vinylidene chloride/ethyl acrylate/glycidyl acrylate copolymer, vinylidene chloride/methyl methacrylate/styrene copolymer, vinylidene chloride/acrylonitrile/styrene copolymer, vinylidene chloride/acrylonitrile/trichloroethylene copolymer, vinylidene chloride/acrylonitrile/vinyl chloride copolymer, vinylidene chloride/acrylonitrile/methacrylic monoglyceride/trichloroethylene copolymer, and vinylidene chloride/methoxyethyl acrylate/methyl acrylate/trichloroethylene copolymer.

Among these copolymers, vinylidene chloride/alkoxyalkyl acrylate or methacrylate/alkyl acrylate or methacrylate/trichloroethylene copolymers are especially preferred for attaining the objects of the present invention.

From the viewpoint of the oxygen barrier property, it is important that the copolymer that is used in the present invention should comprise at least 70% by weight of vinylidene chloride units. In order to effect molding of a plastic bottle or coating of a bottle substrate, it is important that the copolymer should comprise at least 1% by weight of the acrylic or methacrylic monomer. In order to further improve the moldability of the copolymer to a plastic bottle, the copolymer that is used in the present invention may comprise up to 100 parts by weight of other ethylenically unsaturated monomer per 100 parts by weight of the total amount of vinylidene chloride and the acrylic or methacrylic monomer.

In order to improve the adhesion of the copolymer to various plastic bottle substrates, it is preferred that a monomer represented by the following formula:

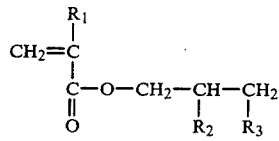

wherein $R_1$ is as defined above and $R_2$ and $R_3$ each stand for a hydroxyl group and these two hydroxyl groups may be dehydrated to form an oxirane ring, be used in an amount of 0.5 to 15% by weight based on the whole monomers.

The copolymer that is used in the present invention can easily be prepared by emulsifying or suspending the constituent monomers in an aqueous medium by an emulsifier or dispersant and carrying out emulsion polymerization or suspension polymerization in the presence of a radical initiator. As the radical initiator, there may be used known peroxides, azo compounds or redox catalysts.

The molecular weight of the copolymer that is used in the present invention is not particularly critical, so far as it has a film-forming molecular weight. The copolymer that is used in the present invention is ordinarily difficult to mold by heating and melting, and therefore, the copolymer of the present invention is molded into a bottle or used for coating a plastic bottle substrate in the form of an aqueous emulsion or latex according to methods described hereinafter.

The copolymer that is used in the present invention is prominently excellent in the combination of the oxygen barrier property and the moisture resistance, and is characterized in that the humidity dependency of the oxygen barrier property is very low. More specifically, the copolymer has an oxygen permeability constant of less than $9 \times 10^{-14}$ cc·cm/cm$^2$·sec·cmHg as measured at a temperature of 20° C. and a relative humidity of 100% and a water vapor permeability constant of less than $3 \times 10^{-3}$ g·cm/m$^2$·day as determined according to the method of JIS Z-0208.

The oxygen permeability constants and water vapor permeability constants of resins customarily used for molding of bottles and the copolymers that are used in the present invention are shown in Table 1.

TABLE 1

Oxygen Barrier Property and Water Vapor Permeability of Various Plastic Films

| Plastics | $O_2$ Barrier Property (20° C.) [cc·cm/cm$^2$·sec·cmHg] | | Water Vapor Barrier Property (JIS Z0208) (g·cm/m$^2$·day) |
|---|---|---|---|
| | (0% RH) | (100% RH) | |
| Et/VA = 30/70 | $4.5 \times 10^{-14}$ | $1.7 \times 10^{-13}$ | $3.3 \times 10^{-1}$ |
| Nylon-6 | $8.0 \times 10^{-14}$ | $9.6 \times 10^{-13}$ | $4.1 \times 10^{-1}$ |
| AN/St = 80/20 | $4.7 \times 10^{-14}$ | $4.9 \times 10^{-14}$ | $1.1 \times 10^{-1}$ |
| PC | $5.2 \times 10^{-12}$ | $5.5 \times 10^{-12}$ | $1.4 \times 10^{-1}$ |
| PET | $4.1 \times 10^{-13}$ | $4.3 \times 10^{-13}$ | $9.0 \times 10^{-2}$ |
| PP | $8.7 \times 10^{-12}$ | $8.7 \times 10^{-12}$ | $3.0 \times 10^{-2}$ |
| HDPE | $4.7 \times 10^{-12}$ | $4.8 \times 10^{-12}$ | $1.5 \times 10^{-2}$ |
| LDPE | $1.9 \times 10^{-11}$ | $1.9 \times 10^{-11}$ | $5.4 \times 10^{-2}$ |
| PVC | $6.7 \times 10^{-13}$ | $6.7 \times 10^{-13}$ | $7.5 \times 10^{-2}$ |
| VdC/VC = 90/10 | $9.5 \times 10^{-14}$ | $9.5 \times 10^{-14}$ | $3.3 \times 10^{-3}$ |
| VdC/VC = 70/30 | $1.8 \times 10^{-13}$ | $1.9 \times 10^{-13}$ | $6.0 \times 10^{-3}$ |
| VdC/AN = 90/10 | $4.0 \times 10^{-14}$ | $4.0 \times 10^{-14}$ | $1.9 \times 10^{-3}$ |
| VdC/AN = 70/30 | $5.1 \times 10^{-14}$ | $5.1 \times 10^{-14}$ | $2.3 \times 10^{-3}$ |
| (VdC/AN):St = (70/30):10 | $8.4 \times 10^{-14}$ | $8.5 \times 10^{-14}$ | $2.9 \times 10^{-3}$ |

Note 1
Each sample is an indrawn sample.
Note 2
The abbrevaitions indicate the following polymers.
Et/VA: ethylene/vinyl alcohol copolymer
NYLON-6: nylon 6
AN/St: acrylonitrile/styrene copolymer
PC: polycarbonate
PET: polyethylene terephthalate
PP: isotactic polypropylene
HDPE: hugh density polyethylene
LDPE: low density polyethylene
PVC: polyvinyl chloride
VdC/VC: vinylidene chloride/vinyl chloride copolymer
VdC/AN: vinylidene chloride/acrylonitrile copolymer
(VdC/AN):St: (vinylidene chloride/acrylonitrile):styrene copolymer Incidentally, each of the numerical values in column "Plastics" in Table 1 shows the composition (copolymerization ratio) of the monomers.

From the data shown in Table 1, it will readily be understood that if the above-mentioned copolymer is used for molding or coating of a plastic bottle according to the present invention, the combination of the oxygen barrier property and water vapor barrier property can be improved prominently over this combination in any of the conventional plastic bottles. Moreover, from the data shown in Table 1, it will readily be understood that in the copolymer that is used in the present invention, the oxygen permeability constant at a relative humidity of 100% is not substantially different from the oxygen permeability constant at a relative humidity of 0%, that is, the humidity dependency of the oxygen permeability constant is substantially zero. It is quite a surprising fact.

Moreover, the carbon dioxide gas barrier property of this copolymer is prominently excellent, and a bottle moled from this copolymer or coated with this copolymer can effectively be used as a carbonated drink vessel.

In the plastic bottle of the present invention, the layer structure is not particularly critical, so far as the above-mentioned vinylidene chloride/acrylic or methacrylic monomer copolymer is present in the form of a layer continuous in the plane direction of the bottle. For example, the plastic bottle may comprise a single layer of the above-mentioned vinylidene chloride/acrylic or methacrylic monomer copolymer or the plastic bottle may have a composite layer or laminate structure including a layer of this copolymer and a layer of a bottle-forming material such as other plastics, paper, metal, glass, rubber, ceramics, non-woven fabric or wood. In the latter case, the copolymer layer may be present as the inner surface layer and/or the outer surface layer of the bottle. Furthermore, the copolymer may be present in the form of an intermediate layer.

As pointed out hereinbefore, the copolymer that is used in the present invention is excellent in the combination of the oxygen barrier property and the water vapor barrier property and the humidity dependency of the oxygen barrier property is extremely low. Accordingly, when this copolymer is used, a plastic bottle having a very thin wall can be obtained. Ordinarily, if the wall-forming component is present in the form of a layer having a thickness of 1 to 500μ, especially 2 to 100μ, within the range where a good form-retaining property is guaranteed, a sufficient content-preserving property is obtained.

The plastic bottle of the present invention is prepared by casting an aqueous latex of the vinylidene chloride/acrylic or methacrylic monomer copolymer in a bottle mold, partially drying the bottle-shaped latex so that the form-retaining property is attained, taking out the partially dried copolymer from the mold and subjecting the copolymer to the main drying to integrally mold the copolymer into a bottle.

An aqueous latex of the copolymer having a solid concentration of 20 to 65% and a viscosity of 3 to 400 centipoises is preferably used in the present invention.

In molding of a plastic bottle or coating of a plastic bottle substrate according to the present invention, known additives may be incorporated into the copolymer latex. For example, in order to reinforce the plastic bottle, there may be incorporated a fibrous reinforcer such as glass fiber, aromatic polyamide fiber, carbon fiber, pulp or cotton linter, a powdery reinforcer such as carbon black or white carbon or a flaky reinforcer such as glass flake or aluminum flake in an amount of 2 to 150% by weight based on the copolymer. Furthermore, in order to obtain a bulking effect, heavy or soft calcium carbonate, gypsum, clay, magnesium sulfate, alumina powder, silica powder or magnesium carbonate may be incorporated in an amount of 5 to 150% by weight based on the copolymer.

Furthermore, one or more of other additives such as plasticizers, thermal stabilizers, antioxidants, ultraviolet absorbents, thickening agents, viscosity depressants, crosslinking agents, blocking preventing agents, lubricants, leveling agents and colorants may be added to the copolymer latex according to known recipes.

One embodiment of the process for molding plastic bottles according to the present invention will now be described with reference to the accompanying drawings.

Figure 2:
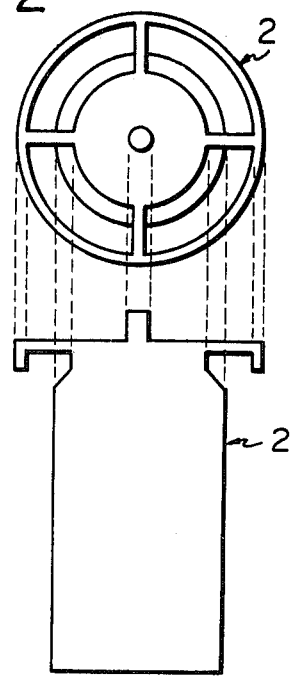
FIG. 2 is a diagram illustrating a core (male mold) to be used in the process of the present invention.
Figure 3:
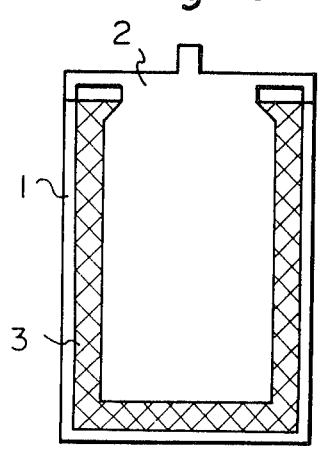
FIG. 3 is a diagram illustrating the casting and partial drying steps in the process of the present invention.
Figure 4:
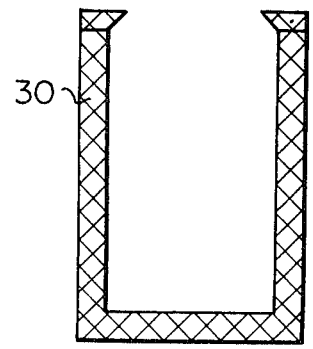
FIG. 4 is a diagram illustrating the main drying step in the process of the present invention.

A core 2 (male mold) shown in FIG. 2 is inserted in a shell 1 (female mold) shown in FIG. 1, and the shell 1 and core 2 are fixed. Then, an aqueous latex 3 of a polyvinylidene chloride type resin used in the present invention is cast in a gap between the shell 1 and core 2 (see FIG. 3). In this case, there may be adopted a method in which the aqueous latex 3 of the resin is first cast in the shell 1 and core 2 is then inserted into the shell 1. The shell and core having the latex filled therein is partially dried at 50° to 150° C. in a perfect oven for 5 seconds to 60 minutes so that the partially dried resin can take a form of a bottle. Then, the shell 1 and core 2 are removed and the preformed product 30 is subjected to the main drying at 40° to 130° C. in an oven for 2 seconds to 25 minutes (see FIG. 4). In this case, there may be adopted a method in which the shell 1 alone is removed and the main drying is carried out by using the core 2 as a sample supporting member. Materials that can be processed and can resist the drying temperature, such as glass, metals, ceramics, other plastics, rubber and wood, can be used as the material of the shell and core. When the parting property of the molded bottle from the shell or core is poor, there may be adopted a method in which a parting agent of the silicone type is thinly coated on the surface of the shell or core and then, molding is carried out.

A combination of a shell (female mold) and a core (male mold) such as mentioned above can preferably be used in the present invention. When the viscosity of the latex is sufficiently high, the latex may be molded into a bottle by a casting method using the male mold alone or a centrifugal molding method using the female mold alone.

The degree of the partial drying may be such that the copolymer layer in the mold or on the mold comes to have a form-retaining property, and practical molding conditions differ according to the kind of the resin, the thickness of the bottle and the molding method adopted. It is ordinarily preferred that the partial drying be carried out at 50° to 120° C. for 30 seconds to 40 minutes.

The bottle-shaped copolymer taken out from the mold is dried again to integrally mold the copolymer into a bottle. This final drying is preferably carried out at 40° to 110° C. for about 20 seconds to about 20 minutes.

The present invention is very valuable for the production of coated plastic bottles.

Figure 5:
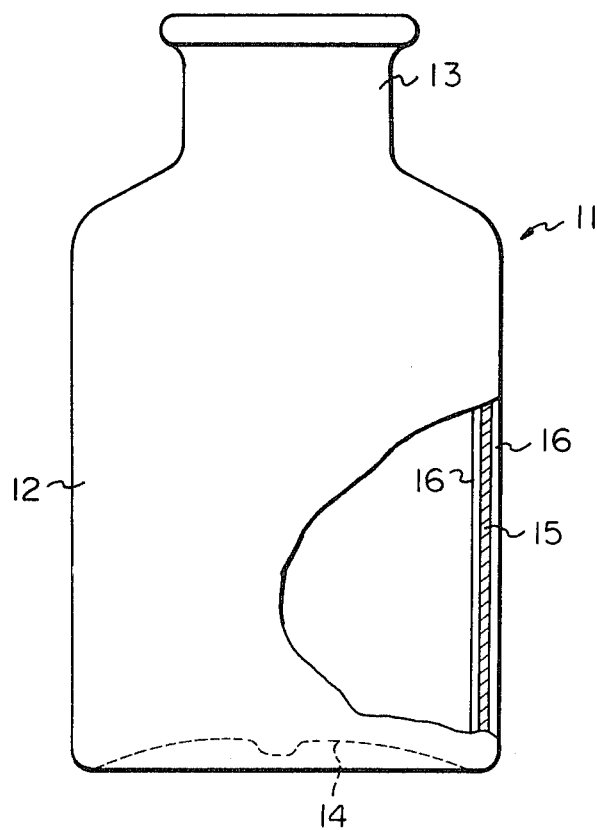
FIG. 5 is a sectional side view illustrating a part of a coated plastic bottle according to the present invention.

Referring to FIG. 5 illustrating a coated plastic bottle of the present invention, a bottle 11 comprises a circumferential wall 12 having a circular or oval section, a mouth portion 13 contiguous integrally to the circumferential wall 12 and a bottom 14 contiguous to the lower end of the circumferential wall 12. All the wall of the bottle comprises a plastic bottle substrate 15 formed from a melt-moldable thermoplastic resin by blow molding, injection molding or biaxially drawing blow molding and a coating layer 16 of a vinylidene chloride/acrylic or methacrylic monomer copolymer formed on the surface of the bottle substrate. This coating layer 16 may be formed on both the surfaces of the bottle substrate 15 as shown in FIG. 5 or only on the inner surface or outer surface of the bottle substrate 15.

Optional plastic bottles formed from a melt-moldable thermoplastic resin by injection molding, blow molding, biaxially drawing blow molding or draw forming can be used as the plastic bottle substrate in the present invention. As the resin that is preferably used for formation of a bottle substrate, there can be mentioned, for example, low density polyethylene, medium density polyethylene, high density polyethylene, polypropylene, olefin type copolymers such as ethylene/propylene copolymers, ethylene/butene copolymers, ionomers, ethylene/vinyl acetate copolymers and ethylene/vinyl alcohol copolymers, polyesters such as polyethylene terephthalate, polybutylene terephthalate and polyethylene terephthalate/isophthalate, polyamides such as nylon 6, nylon 6,6 and nylon 6,10, polystyrene, styrene type copolymers such as styrene/butadiene block copolymers, styrene/acrylonitrile copolymers, styrene/butadiene/acrylonitrile copolymers (ABS resins), polyvinyl chloride, vinyl chloride type copolymers such as vinyl chloride/vinyl acetate copolymers, polymethyl methacrylate and acrylic copolymers such as methyl methacrylate/ethyl acrylate copolymers, and polycarbonate. These thermoplastic resins may be used singly or in the form of a blend of two or more of them. The plastic bottle substrate may have a single layer structure or a multi-layer laminate structure formed, for example, by simultaneous melt extrusion.

Of course, at least one additive selected from pigments, antioxidants, antistatic agents, ultraviolet absorbents and lubricants may be added in a total additive amount of 0.001 to 5.0 parts by weight per 100 parts by weight of the resin according to need. Furthermore, in order to reinforce this plastic bottle substrate, one or more of a fibrous reinforcer such as glass fiber, aromatic polyamide fiber, carbon fiber, pulp or cotton linter, a powdery reinforcer such as carbon black or white carbon and a flaky reinforcer such as glass flake or aluminum flake may be added in a total amount of 2 to 150 parts by weight per 100 parts by weight of the thermoplastic resin. Moreover, in order to obtain a bulking effect, one or more of heavy or soft calcium carbonate, mica, talc, kaoline, gypsum, clay, barium sulfate, alumina powder, silica powder and magnesium carbonate may be added in a total amount of 5 to 150 parts by weight per 100 parts by weight of the thermoplastic resin according to a known recipe.

One of prominent advantages of the present invention is that even if an olefin type resin which is relatively cheap and excellent in the processability but is poor in the gas barrier property is used, a bottle excellent in the gas barrier property can be obtained.

A bottle substrate used in the present invention can easily be obtained according to a blow molding method in which at least one member selected from the above-mentioned thermoplastic resins is melt-extruded in the form of a parison, supporting the extruded parison in a split mold and blowing a fluid into the parison. In order to obtain a bottle having improved shock resistance and transparency, there may be adopted a method in which a parison or preformed product is prepared by melt extrusion or injection molding, the parison or preformed product is mechanically drawn in the axial direction at a temperature lower than the melting point of the resin and simultaneously drawing the parison or preformed product in the circumferential direction by blowing a fluid into the parison or preformed product to obtain a biaxially oriented plastic bottle. The former blow molding method is effective for molding of polyethylene or polypropylene, and the latter biaxially drawing blow molding method is advantageously applied to molding of polyethylene terephthalate or polypropylene. Still further, a deeply-drawn wide-mouthed bottle formed by subjecting a preformed sheet or film to air-pressure forming or plug assist forming can advantageously be used in the present invention.

The thickness of the plastic bottle substrate can be changed in a broad range of from a relatively small thickness of a so-called squeeze vessel to a relatively large thickness for a rigid vessel. The base amount, that is, the weight per unit inner volume, is appropriately chosen from the range of 0.001 to 5 g/ml according to the intended use of the product bottle.

The coated plastic bottle of the present invention is formed by coating at least one surface of the so-prepared plastic bottle substrate with an aqueous latex of the above-mentioned copolymer and drying the so formed coating.

Coating of the plastic bottle substrate with the above-mentioned copolymer latex may be accomplished by adopting at least one of known coating methods such as dip coating, spray coating, brush coating, roller coating, electrostatic coating, centrifugal coating, cast coating and electrophotoresis coating methods. The coating operation may be conducted only once or a multiple stage coating method may be adopted. If desired, the plastic bottle substrate may be subjected to a wetting property-improving preliminary treatment such as a pretreatment with an anchoring agent, a corona discharge treatment, a surface active agent coating treatment or a chemical etching treatment. Furthermore, in order to impart an electric conductivity, the plastic bottle substrate may be subjected to a conducting treatment.

In the present invention, it is preferred that a coating layer of the above-mentioned copolymer be formed on both the surfaces of the plastic bottle substrate. However, in order to shut gases contained in air, the coating layer may be formed on the outer surface alone, and in order to prevent escape of a gas or perfume from the content of the bottle, the coating layer may be formed on the inner surface alone.

The conditions adopted for drying the coated copolymer layer are changed according to the thickness of the coating layer, but ordinarily, a sufficient drying effect can be attained when drying is carried out at a temperature of 40° to 150° C. for about 2 seconds to about 60 minutes.

The effect of shutting a gas or perfume can be attained sufficiently by the above-mentioned drying operation alone, but the effect is further enhanced if an aging treatment (heat treatment) is carried out at a temperature of 30° to 120° C. for 30 seconds to 7 days after the drying operation, if desired.

As pointed out hereinbefore, the copolymer that is used in the present invention is excellent in the combination of the oxygen barrier property and water vapor barrier property and the humidity dependency of the oxygen barrier property is very low. Accordingly, when the copolymer is formed on the plastic bottle substrate in the form of a very thin layer, excellent barrier properties to various gases can be obtained. More specifically, satisfactory results can ordinarily be obtained if the copolymer is formed in a layer having a thickness of 0.5 to 40$\mu$, especially 1 to 30$\mu$.

According to still another embodiment of the process for the preparation of plastic bottles of the present invention, a parison, preformed product or sheet of a thermoplastic resin to be formed into a plastic bottle substrate is coated with a latex of the above-mentioned copolymer and then dried to form a coating layer and the coated structure is subjected to drawing blow molding or deep draw forming to obtain a coated plastic bottle. By this plastic processing, monoaxial or biaxial molecular orientation is given to the plastic bottle substrate and the rigidity, shock resistance and transparency are improved. The coating of the above-mentioned copolymer used in the present invention can resist such processing and is advantageous in that the adhesion to the substrate is not lost by such processing.

By virtue of these advantages, the plastic bottle of the present invention is very valuable as a light-weight bottle for preserving liquid foods, seasonings, drinks, medicines, cosmetics and agricultural chemicals.

The present invention will now be described in detail with reference to the following Examples that by no means limit the scope of the present invention.

The oxygen permeability and water vapor permeability of bottles and the oxygen permeability constant $PO_2$ and water vapor permeability constant $PH_2O$ of vinylidene chloride type resins were determined according to the following methods.

(1) Oxygen Permeation rate $QO_2$ at 20° C. and 0% RH:

A barrel wall or bottom portion of a bottle to be measured was cut into a predetermined size and an obtained sheet-like sample was used for the measurement. A gas permeation tester manufactured by Toyo Tester Kogyo K.K. was used for the measurement. The sample was fixed between two chambers of this tester, and suction was effected in one chamber so that the pressure was reduced below $10^{-2}$ mmHg (low pressure side) while in the other chamber (high pressure side), the atmosphere was replaced by dehumidified oxygen gas so that the oxygen gas pressure was one atmosphere. The change of the pressure increase with the lapse time was read on a recorder and the oxygen gas permeation rate $QO_2$ was determined from the read values.

The measurement was carried out at 20° C. and the moisture was removed from the high pressure side chamber so that the relative humidity was 0%.

(2) Oxygen Permeation rate $QO_2$ at 20° C. and 100% RH:

A barrel wall or bottom portion of a bottle to be measured was cut into a sheet-like sample and the measurement was carried out by using an oxygen gas permeation tester (Mocon OX-Tran 100 manufactured by Modern Control Co.). More specifically, the oxygen gas permeation rate $QO_2$ was measured at 20° C. while maintaining a saturated water vapor pressure (100% RH) in either the oxygen chamber or the nitrogen chamber.

(3) Water Vapor Permeation Rate $QH_2O$:

The water vapor permeation rate $QH_2O$ was measured according to the method of JIS Z-0208 (at a temperature of 40° C. and a relative humidity of 0 and 90%). A barrel wall or bottom portion of a bottle to be measured was cut into a sheet-like sample having a predetermined size and this sample was used for the measurement.

(4) Oxygen Gas Permeability Constant $PO_2$ and Water Vapor Permeability Constant $PH_2O$ of Polyvinylidene Chloride Resins in Case of Coated Plastic Bottles:

The values $QO_2$ and $QH_2O$ determined on coated plastic bottles according to the above-mentioned methods (1) and (3) are those of composite systems comprising a polyvinylidene chloride type resin coating and a plastic bottle substrate. The oxygen gas permeability constants $PO_2$ and water vapor permeability constants $PH_2O$ of the polyvinylidene chloride type resins at respective temperatures and relative humidities were calculated from the above values according to the following formulae:

$$PO_2 = \frac{(1.52 \times 10^{-15}) \times h}{\left(\frac{1}{QO_2} - \frac{1}{(QO_2)B}\right)} \quad [cc \cdot cm/cm^2 \cdot sec \cdot cmHg]$$

and $$PH_2O = \frac{(1 \times 10^{-4}) \times h}{\frac{1}{QH_2O} - \frac{1}{(QH_2O)B}} \quad [g \cdot cm/m^2 \cdot day]$$

wherein h stands for the thickness ($\mu$) of the coating of the polyvinylidene chloride resin, $QO_2$ stands for the oxygen permeation rate ($cc/m^2 \cdot day \cdot atm$) of the composite system, $(QO_2)B$ stands for the oxygen permeation rate ($cc/m \cdot day \cdot atm$) of the bottle substrate, $QH_2O$ stands for the water vapor permeation rate ($g/m^2 \cdot day$) of the composite system and $(QH_2)B$ stands for the water vapor permeation rate ($g/m^2 \cdot day$) of the bottle substrate.

EXAMPLE 1

Glass shell and core as shown in FIGS. 1 and 2 were washed with methanol, and a polyvinylidene chloride type resin emulsion having a composition in Table 2 (dispersion medium=water, emulsifier=Poval, solid concentration=46%) was cast between the shell and core and the shell and core were fixed by a weight. The cast emulsion was preliminarily dried (partial drying) at 70° C. for 15 minutes in a perfect oven (explosion-proof oven). Then, the shell was removed and the preliminary drying product was further dried at 70° C. for 2 minutes in the same perfect oven. The core was then removed. A cylindrical bottle was thus molded.

The oxygen permeability constants (hereinafter referred to as "$PO_2$") and water vapor permeability constants (hereinafter referred to as "$PH_2O$") of the so-obtained four poly(vinylidene chloride/acrylonitrile) type plastic bottles were determined according to the methods described hereinbefore.

The obtained results are shown in Table 2. From these results, it will readily be understood that when the copolymerization ratio of vinylidene chloride (VdC) is at least 70% by weight, the $PH_2O$ value is decreased and the barrier property is improved.

TABLE 2

| Sample Mark | Copolymerization Ratio (% by weight) of Vinylidene Chloride (VdC) | Copolymerization Ratio (% by weight) of Acrylonitrile (AN) | $PO_2[cc \cdot cm/cm^2 \cdot sec \cdot cmHg]$ | | $PH_2O[g \cdot cm/cm^2 \cdot day]$ (JIS Z-0208) |
|---|---|---|---|---|---|
| | | | 20° C., 0% RH | 20° C., 100% RH | |
| A | 99 | 1 | $1.6 \times 10^{-14}$ | $1.6 \times 10^{-14}$ | $0.7 \times 10^{-3}$ |
| B | 90 | 10 | $3.9 \times 10^{-14}$ | $4.0 \times 10^{-14}$ | $1.7 \times 10^{-3}$ |
| C | 70 | 30 | $5.1 \times 10^{-14}$ | $5.1 \times 10^{-14}$ | $2.2 \times 10^{-3}$ |
| D | 60 | 40 | $6.3 \times 10^{-14}$ | $6.5 \times 10^{-14}$ | $9.0 \times 10^{-3}$ |

COMPARATIVE EXAMPLE 1

Polyvinylidene chloride type resin emulsions (dispersion medium=water, emulsifier=Poval, solid concentration=46%) were molded into bottles according to the method described in Example 1. The polyvinylidene chloride type resins used comprised 90 to 70% by weight of vinylidene chloride (VdC) and 10 or 30% by weight of vinyl chloride (VC).

The PO$_2$ and PH$_2$O values of the so-obtained poly(vinylidene chloride/vinyl chloride) type plastic bottles were determined according to the methods described hereinbefore.

The obtained results are shown in Table 3. When these results are compared with the results shown in Table 2, it will readily be understood that when the comonomer is vinyl chloride (VC), the PO$_2$ and PH$_2$O values are larger than those obtained when acrylonitrile (AN) is used as the comonomer, if the copolymerization ratio is the same, and therefore, the bottles obtained by using VC as the comonomer are inferior to the bottles obtained by using AN as comonomer in the barrier property.

TABLE 3

| Sample Mark | Copolymerization Ratio (% by weight) of VdC | Copolymerization Ratio (% by weight) of VC | PO$_2$[cc · cm/cm$^2$ · sec · cmHg] (20° C., 0% RH) | (20° C., 100% RH) | PH$_2$O[g · cm/cm$^2$ · day] (JIS Z-0208) |
|---|---|---|---|---|---|
| B' | 90 | 10 | $9.3 \times 10^{-14}$ | $9.5 \times 10^{-14}$ | $3.4 \times 10^{-3}$ |
| C' | 70 | 30 | $1.8 \times 10^{-13}$ | $1.9 \times 10^{-13}$ | $6.1 \times 10^{-3}$ |

COMPARATIVE EXAMPLE 2

The polyvinylidene chloride type resin emulsions A and C shown in Example 1 were molten and extruded by a vent-provided extruder having a screw 40 mm in diameter and 200 mm in effective length. The temperature of the cylinder portion of the extruder was set at 170° C., and the rotation number of the screw was 15 rpm.

Each of the two resin extrudates was blackened by thermal decomposition, and the extrudates did not show a shape of a parison.

EXAMPLE 2

An emulsion of a polyvinylidene chloride type resin comprising 70% by weight vinylidene chloride, 10% by weight of methyl acrylate and 20% by weight of glycidyl methacrylate (dispersion medium=water, emulsifier=sodium lignosulfonate, solid concentration=61%) was molded into a bottle according to the method described in Example 1.

The so-obtained poly(vinylidene/methyl acrylate/glycidyl methacrylate) type plastic bottle was subjected to aging (heat treatment) in a thermostat tank maintained at 48° C. for 24 hours, and the PO$_2$ and PH$_2$O values were determined according to the methods described hereinbefore.

The obtained results are shown in Table 4.

EXAMPLE 3

An emulsion of a polyvinylidene chloride type resin comprising 96% by weight of vinylidene chloride, 2% by weight of methyl acrylate and 2% by weight of glycidyl methacrylate (dispersion medium=water, emulsifier=rosin soap, solid concentration=37%) was molded into a bottle according to the method described in Example 1.

The so-obtained poly(vinylidene/methyl acrylate/glycidyl methacrylate) type plastic bottle was subjected to aging (heat treatment) in a thermostat tank maintained at 48° C. for 24 hours. The PO$_2$ and PH$_2$O values were determined according to the methods described hereinbefore.

The obtained results are shown in Table 4.

EXAMPLE 4

An emulsion of a polyvinylidene chloride type resin comprising 86% by weight of vinylidene chloride, 5% by weight of acrylonitrile, 3% by weight of methyl acrylate and 6% by weight of glycidyl methacrylate (dispersion medium=water, emulsifier=Poval, solid concentration=51%) was molded into a bottle according to the method described in Example 1.

The so-obtained polyvinylidene chloride type plastic bottle was subjected to aging (heat treatment) in a thermostat tank maintained at 61° C. for 6 hours. The PO$_2$ and PH$_2$O values were determined according to the methods described hereinbefore.

The obtained results are shown in Table 4.

EXAMPLE 5

An emulsion of a polyvinylidene chloride type resin comprising 80% by weight of vinylidene chloride, 10% by weight of methyl acrylate and 10% by weight of acrylic glyceride and including 50 parts by weight of vinyl chloride per 100 parts by weight of the foregoing monomers (dispersion medium=water, emulsifier=gelatin, solid concentration=30%) was molded into a bottle according to the method described in Example 1. The partial drying was carried out at 40° C. for 50 minutes and the main drying was carried out at 40° C. for 25 minutes.

The so-obtained polyvinylidene chloride type plastic bottle was subjected to aging (heat treatment) in a thermostat tank maintained at 30° C. for 7 days. The PO$_2$ and PH$_2$O values were determined according to the methods described hereinbefore.

The obtained results are shown in Table 4.

COMPARATIVE EXAMPLE 3

An emulsion of a polyvinylidene chloride type resin comprising 80% by weight of vinylidene chloride, 10% by weight of methyl acrylate and 10% by weight of acrylic glyceride and including 150 parts by weight of vinyl chloride per 100 parts by weight of the foregoing monomers (dispersion medium=water, emulsifier=gelatin, solid concentration=30%) was molded into a bottle according to the method described in Example 5.

The so-obtained polyvinylidene chloride type plastic bottle was subjected to aging (heat treatment) in a thermostat tank maintained at 30° C. for 7 days. The PO$_2$ and PH$_2$O values were determined according to the methods described hereinbefore.

The obtained results are shown in Table 4.

EXAMPLE 6

A latex of a polyvinylidene chloride type resin comprising 75% by weight of vinylidene chloride, 20% by weight of methoxyethyl acrylate and 5% by weight of acrylic acid (dispersion medium=water, emulsifier=Poval, solid concentration=50%) was molded into a bottle according to the method described in Example 1. The partial drying was carried out at 110° C. for 1 minute and the main drying was carried out at 100° C. for 30 seconds in a different oven.

The so-obtained bottle (sample mark D) was subjected to aging (heat treatment) in a thermostat tank maintained at 48° C. for 24 hours (sample mark E). The $PO_2$ and $PH_2O$ values of these two bottles D and E were determined according to the methods described hereinbefore.

The obtained results are shown in Table 4.

EXAMPLE 7

A latex of a polyvinylidene chloride type resin comprising 83% by weight of vinylidene chloride, 14% by weight of methoxyethylmethyl methacrylate and 3% by weight of methacrylic acid and including 40 parts by weight of trichloroethylene per 100 parts by weight of the foregoing monomers (dispersion medium=water, emulsifier=Poval, solid concentration=47%) was molded into a bottle according to the method described in Example 1. The partial drying was carried out at 60° C. for 20 minutes and the main drying was carried out at 70° C. for 10 minutes in a different oven.

The so-obtained polyvinylidene chloride plastic type bottle was subjected to heat treatment (aging) in a thermostat tank maintained at 48° C. for 48 hours. The $PO_2$ and $PH_2O$ values were determined according to the methods described hereinbefore.

The obtained results are shown in Table 4.

was subjected to heat treatment at 100° C. for 30 seconds. Then, an emulsion of a polyvinylidene chloride type resin having a composition shown in Table 5 (dispersion medium=water, emulsifier=Poval, solid concentration=45%) was coated on the bottle according to the dip coating method. The coated bottle was dried at 70° C. for 10 minutes in a perfect oven (explosion-proof type). The average coating thickness of the polyvinylidene chloride type resin was 11μ.

The oxygen permeability constants ($PO_2$) and water vapor permeability constants ($PH_2O$) of the so obtained four poly(vinylidene chloride/acrylonitrile) type resin-coated, biaxially drawn polypropylene bottles and the starting uncoated, biaxially drawn polypropylene bottle were determined according to the methods described hereinbefore.

The obtained results are shown in Table 5. From the results shown in Table 5, it will readily be understood that the $PO_2$ and $PH_2O$ values of the coated bottles are apparantly smaller than those of the uncoated bottles and that when the copolymerization ratio of vinylidene chloride (VdC) is 70% by weight of higher, the $PH_2O$ value is extremely reduced and the barrier property is highly improved.

TABLE 5

| Sample Mark | Copolymerization Ratio (% by weight) of Vinylidene Chloride (VdC) | Copolymerization Ratio (% by weight) of Acrylonitrile (AN) | $PO_2[cc \cdot cm/cm^2 \cdot sec \cdot cmHg]$ | | $PH_2O[g \cdot cm/cm^2 \cdot day]$ JIS Z-0208 |
|---|---|---|---|---|---|
| | | | 20° C., 0% RH | 20° C., 100% RH | |
| CA | 99 | 1 | $1.5 \times 10^{-14}$ | $1.6 \times 10^{-14}$ | $0.70 \times 10^{-3}$ |
| CB | 90 | 10 | $3.9 \times 10^{-14}$ | $3.9 \times 10^{-14}$ | $1.6 \times 10^{-3}$ |
| CC | 70 | 30 | $5.0 \times 10^{-14}$ | $5.0 \times 10^{-14}$ | $2.1 \times 10^{-3}$ |
| CD | 60 | 40 | $6.2 \times 10^{-14}$ | $6.3 \times 10^{-14}$ | $9.1 \times 10^{-3}$ |
| uncoated* | — | — | $4.5 \times 10^{-12}$ | $4.6 \times 10^{-12}$ | $1.9 \times 10^{-2}$ |

Note
*biaxially drawn polypropylene bottle not coated with polyvinylidene chloride type resin

TABLE 4

| Example No. | $PO_2[cc \cdot cm/cm^2 \cdot sec \cdot cmHg]$ | | $PH_2O[g \cdot cm/m^2 \cdot day]$ (JIS Z-2080) |
|---|---|---|---|
| | 20° C., 0% RH | 20° C., 100% RH | |
| 2 | $2.2 \times 10^{-14}$ | $2.3 \times 10^{-14}$ | $1.8 \times 10^{-3}$ |
| 3 | $1.2 \times 10^{-14}$ | $1.2 \times 10^{-14}$ | $0.96 \times 10^{-3}$ |
| 4 | $2.0 \times 10^{-14}$ | $2.0 \times 10^{-14}$ | $1.5 \times 10^{-3}$ |
| 5 | $6.0 \times 10^{-14}$ | $6.1 \times 10^{-14}$ | $2.4 \times 10^{-3}$ |
| Comparative Example 3 | $12.2 \times 10^{-14}$ | $12.7 \times 10^{-14}$ | $6.2 \times 10^{-1}$ |
| 6-D | $7.2 \times 10^{-14}$ | $7.3 \times 10^{-14}$ | $2.7 \times 10^{-3}$ |
| 6-E | $1.8 \times 10^{-14}$ | $1.8 \times 10^{-14}$ | $1.0 \times 10^{-3}$ |
| 7 | $1.6 \times 10^{-14}$ | $1.6 \times 10^{-14}$ | $0.97 \times 10^{-3}$ |

EXAMPLE 8

An anchoring agent (EL-220/EL-200-AD supplied to Toyo Morton K.K.) was coated on the outer surface of a biaxially drawn cylindrical polypropylene bottle having an inner volume of 1000 cc, a weight of 30 g and an average thickness of 0.45 mm, and the coated bottle

COMPARATIVE EXAMPLE 4

The outer surface of the same biaxially drawn polypropylene bottle as described in Example 8 was coated with an emulsion of a polyvinylidene chloride resin comprising 90% or 70% by weight of vinylidene chloride (VdC) and 10 or 30% by weight of vinyl chloride (VC) (dispersion medium=water, emulsifier=Poval, solid concentration=45%). The coating method, drying method and coating amount (coating thickness) were the same as described in Example 8.

The $PO_2$ and $PH_2O$ values of the so obtained poly(vinylidene chloride/vinyl chloride) resin-coated polypropylene bottles were determined according to the methods described hereinbefore.

The obtained results are shown in Table 6. When the results shown in Table 6 are compared with the results shown in Table 5, it will readily be understood that the $PO_2$ and $PH_2O$ values of the bottle obtained by using vinyl chloride (VC) as the comonomer are larger than those of the bottle prepared by using acrylonitrile (AN) as the comonomer if the copolymerization ratio is the same, and that the former bottle is inferior to the latter bottle in the barrier property.

TABLE 6

| Sample Mark | Copolymerization Ratio (% by weight) of VdC | Copolymerization Ratio (% by weight) of VC | $PO_2[cc \cdot cm/cm^2 \cdot sec \cdot cmHg]$ | | $PH_2O[g \cdot cm/cm^2 \cdot day]$ (JIS Z-0208) |
|---|---|---|---|---|---|
| | | | 20° C., 0% RH | 20° C., 100% RH | |
| CB' | 90 | 10 | $9.4 \times 10^{-14}$ | $9.4 \times 10^{-14}$ | $3.5 \times 10^{-3}$ |

TABLE 6-continued

| Sample Mark | Copolymerization Ratio (% by weight) of VdC | Copolymerization Ratio (% by weight) of VC | $PO_2[cc \cdot cm/cm^2 \cdot sec \cdot cmHg]$ 20° C., 0% RH | 20° C., 100% RH | $PH_2O[g \cdot cm/cm^2 \cdot day]$ (JIS Z-0208) |
|---|---|---|---|---|---|
| CC' | 70 | 30 | $1.8 \times 10^{-13}$ | $1.9 \times 10^{-13}$ | $6.0 \times 10^{-3}$ |

COMPARATIVE EXAMPLE 5

The emulsion of the polyvinylidene chloride type resin CA or CC described in Example 8 and isotactic polypropylene were co-melt-extruded by using a vent-provided outer layer extruder comprising a screw having a diameter of 40 mm and an effective length of 800 mm and an inner layer extruder comprising a screw having a diameter of 65 mm and an effective length of 1430 mm, respectively, according to the known co-extruding hollow molding method. In each of the outer layer extruder and inner layer extruder, the screw rotation number was 15 rpm and the temperature of the cylinder portion and two-ply die were maintained at 170° C.

The two resin extrudates as the outer layer were blackened by thermal decomposition, and hollow molding into bottles was impossible.

EXAMPLE 9

The inner and outer surfaces of a polyvinyl chloride cylindrical bottle having an inner volume of 1000 cc, a weight of 27 g and an average thickness of 0.35 mm were coated with a latex of a polyvinylidene chloride type resin comprising 70% by weight of vinylidene chloride, 10% by weight of methyl acrylate and 20% by weight of glycidyl methacrylate (dispersion medium=water, emulsifier=sodium lignosulfonate, solid concentration=61%) according to the dip coating method. The coated bottle was dried in an air-circulated oven at 55° C. for 60 minutes. The average thickness of the polyvinylidene chloride type resin coatings formed on the inner and outer surfaces of the polyvinyl chloride bottle was 25μ. This bottle is designated as bottle CFn.

The bottle CFn was subjected to aging (heat treatment) in a thermostat tank maintained at 48° C. for 24 hours. This bottle is designated as bottle CFa.

The $PO_2$ and $PH_2O$ values of the so-obtained bottles CFn and CFa and the uncoated polyvinyl chloride bottle (designated as bottle PVC) as a comparative bottle were determined according to the methods described hereinbefore.

The obtained results are shown in Table 7.

EXAMPLE 10

The outer surface of a cylindrical polycarbonate bottle having an inner volume of 400 cc, a weight of 12 g and an average thickness of 0.30 mm was coated with an anchoring agent (El-220/EL-200-AD supplied by Toyo Morton Co.) according to the dip coating method. Then, the bottle was dried at 70° C. for 15 minutes and spray-coated with a latex of a polyvinylidene type resin comprising 96% by weight of vinylidene chloride, 2% by weight of methyl acrylate and 2% by weight of glycidyl methacrylate (dispersion medium=water, emulsifier=rosin soap, solid concentration=37%). The coated bottle was dried at 80° C. for 2 minutes in an air-circulated oven. The average thickness of the polyvinylidene chloride resin coating formed on the outer surface of the polycarbonate bottle was 1.7μ. The so-obtained bottle is designated as bottle CGn. The bottle CGn was subjected to aging (heat treatment) in a thermostat tank maintained at 48° C. for 24 hours. The bottle is designated as bottle CGa.

The $PO_2$ and $PH_2O$ values of the so-obtained bottles CGn and CGa and the uncoated polycarbonate bottle (designated as bottle PC) as a comparative sample were determined according to the methods decribed hereinbefore.

The obtained results are shown in Table 7.

EXAMPLE 11

The outer surface of a cylindrical polymethyl methacrylate bottle having an inner volume of 200 cc, a weight of 18 g and an average thickness of 0.55 mm was brush-coated with a latex of a polyvinylidene chloride type resin comprising 86% by weight of vinylidene chloride, 5% by weight of acrylonitrile, 3% by weight of methyl acrylate and 6% by weight of glycidyl methacrylate (dispersion medium=water, emulsifier=Poval, solid concentration=51%). The coated bottle was dried at 90° C. for 1 minute in an air-circulated oven. The average thickness of the polyvinylidene chloride type resin coating formed on the polymethyl methacrylate bottle was 15μ. The resulting bottle was subjected to aging (heat treatment) in a thermostat tank maintained at 61° C. for 6 hours. The obtained bottle is designated as bottle CHa.

The $PO_2$ and $PH_2O$ values of the so-obtained bottle CHa and the uncoated polymethyl methacrylate bottle as a comparative bottle (designated as bottle PMMA) were determined according to the methods described hereinbefore.

The obtained results are shown in Table 7.

EXAMPLE 12

The inner and outer surfaces of a cylindrical acrylonitrile/styrene/butadiene copolymer bottle having an inner volume of 200 cc, a weight of 12 g and an average thickness of 0.50 mm were coated with a latex of a polyvinylidene chloride type resin comprising 80% by weight of vinylidene chloride, 10% by weight of methyl acrylate and 10% by weight of acrylic monoglyceride and including 50 parts by weight of vinyl chloride per 100 parts by weight of the foregoing monomers (dispersion medium=water, emulsifier=gelatin, solid concentration=30%) according to the dip coating method. The coated bottle was dried at 40° C. for 60 minutes in an air-circulated oven. The average thickness of the polyvinylidene chloride type resin coatings formed on the inner and outer surfaces of the acrylonitrile/styrene/butadiene copolymer bottle was 2.8μ. The obtained bottle was subjected to aging (heat treatment) in a thermostat tank maintained at 30° C. for 7 days. The obtained bottle is designated as bottle CJa.

The $PO_2$ and $PH_2O$ values of the so-obtained bottle CJa and the uncoated acrylonitrile/styrene/butadiene copolymer bottle (designated as bottle ABS) as a comparative bottle were determined according to the methods described hereinbefore.

The obtained results are shown in Table 7.

COMPARATIVE EXAMPLE 6

The inner and outer surfaces of a cylindrical acrylonitrile/styrene/butadiene copolymer bottle having an inner volume of 200 cc, a weight of 12 g and an average thickness of 0.50 mm were coated with a latex of a polyvinylidene chloride type resin comprising 80% by weight of vinylidene chloride, 10% by weight of methyl acrylate and 10% by weight of acrylic monoglyceride and including 150 parts by weight of vinyl chloride per 100 parts by weight of the foregoing monomers (dispersion medium=water, emulsifier=gelatin, solid concentration=30%) according to the dip coating method. The coated bottle was dried at 40° C. for 10 hours in an air-circulated oven. The average thickness of the polyvinylidene chloride type coatings formed on the inner and outer surfaces of the acrylonitrile/styrene/butadiene copolymer was 3.5μ. The obtained bottle was subjected to aging (heat treatment) in a thermostat tank maintained at 30° C. for 7 days. The so-obtained bottle is designated as bottle CKa.

The $PO_2$ and $PH_2O$ values of the so-obtained bottle CKa were determined according to the methods described hereinbefore.

The obtained results are shown in Table 7.

EXAMPLE 13

The outer surface of a cylindrical atactic polystyrene bottle having an inner volume of 200 cc, a weight of 23 g and an average thickness of 0.85 mm was coated with an anchoring agent (EL-220/EL-200-AD supplied by Toyo Morton K.K.) according to the spray-coating method and the bottle was dried at 80° C. for 10 minutes. The bottle was then coated with a latex of a polyvinylidene chloride type resin comprising 75% by weight of vinylidene chloride, 20% by weight of methoxyethyl acrylate and 5% by weight of acrylic acid (dispersion medium=water, emulsifier=Poval, solid concentration=50%) according to the combination of the spray-coating method and brush-coating method. The coated bottle was dried at 110° C. for 30 seconds in an air-circulated oven. The average thickness of the polyvinylidene chloride type resin coating formed on the outer surface of the atactic polystyrene bottle was 15μ. This bottle is designated as bottle CLn. The bottle CLn was subjected to aging (heat treatment) in a thermostat tank maintained at 60° C. for 24 hours. The so-obtained bottle is designated as bottle CLa.

The $PO_2$ and $PH_2O$ values of the so-obtained bottles CLa and CLn and the uncoated atactic polystyrene bottle (designated as bottle PS) as a comparative bottle were determined according to the methods described hereinbefore.

The obtained results are shown in Table 7.

EXAMPLE 14

The inner surface of a biaxially drawn polyethylene terephthalate cylindrical bottle having an inner volume of 1000 cc, a weight of 45 g and an average thickness of 0.54 mm was coated with a latex of a polyvinylidene chloride type resin comprising 83% by weight of vinylidene chloride, 14% by weight of methoxyethylmethyl methacrylate and 3% by weight of methacrylic acid and including 40 parts by weight of trichloroethylene per 100 parts by weight of the foregoing monomers (dispersion medium=water, emulsifier=Poval, solid concentration=47%) according to the dip coating method. The coated bottle was then dried at 70° C. for 10 minutes in an air-circulated oven. The average thickness of the polyvinylidene chloride type resin coating formed on the inner surface of the biaxially drawn polyethylene terephthalate bottle was 10μ. The so-obtained bottle is designated as bottle CNn. The CNn bottle was subjected to aging in a thermostat tank maintained at 48° C. for 48 hours. The obtained bottle is designated as bottle CNa.

The $PO_2$ and $PH_2O$ values of the so-obtained bottles CNn and CNa and the uncoated, biaxially drawn polyethylene terephthalate bottle (designated as bottle 10PET) as a comparative bottle were determined according to the methods described hereinbefore.

The obtained results are shown in Table 7.

The carbon dioxide gas permeation constant ($PCO_2$) of the polyvinylidene chloride type resin was determined with respect to each of the bottles CNn and CNa and the comparative bottle 10PET by using a gas permeation tester manufactured by Toyo Tester Kogyo K.K. according to the method described hereinbefore. The measurement was carried out at a temperature of 27° C. and a relative humidity of 0 or 91%.

The obtained results are shown in Table 8.

Five each of the bottles CNn and CNa were filled with 900 cc of city service water and the mouth portions were capped. The capped bottles were subjected to the falling test by causing the bottles to fall down from a height of 2 m on a concrete floor. The test was repeated 10 times at maximum.

In none of the tested bottles, cracking or peeling of the polyvinylidene chloride type resin coating from the bottle substrate (10PET) was observed.

EXAMPLE 15

The inner surface of an amorphous polyethylene terephthalate preform (bottomed parison) having an outer surface area of 130 $cm^2$, a weight of 62.5 g and an average thickness of 3.60 mm was coated with the polyvinylidene chloride type resin latex described in Example 14 according to the dip coating method so that the amount of the coating was 0.22 g as solids. Then, the coated preform was heated at 100° C. for 20 seconds and biaxially drawn and blow-molded by using a known biaxially drawing blow molding machine to obtain a biaxially drawn polyethylene terephthalate bottle having an inner volume of 2000 cc and an average total thickness of about 0.50 mm, which has the inner surface coated with the polyvinylidene chloride type resin (the average coating thickness was 1.4μ). The so-obtained bottle is designated as CPn. The bottle CPn was subjected to aging (heat treatment) in a thermostat tank maintained at 48° C. for 48 hours. The so obtained bottle is designated as bottle CPa.

The $PO_2$ and $PH_2O$ values of the so-obtained bottles CPn and CPa and the uncoated, biaxially drawn polyethylene terephthalate bottle (designated as bottle 20PET) as a comparative bottle were determined according to the methods described hereinbefore.

The obtained results are shown in Table 7.

The carbon dioxide gas permeation constants ($PCO_2$) of the polyvinylidene chloride type resin coating of the bottles CPn and CPa and the comparative bottle 20PET were determined by using a permeation tester manufactured by Toyo Tester Kogyo K.K. according to the method described hereinbefore at a temperature of 27° C. and a relative humidity of 0 or 91%.

The obtained results are shown in Table 9.

Ten each of these bottles CPn and CPa were filled with 1950 cc of city service water and the mouth portions were capped. The capped bottles were allowed to stand still for 48 hours in an atmosphere maintained at 5° C. Then, the bottle was subjected to the repeated falling test by causing the bottles to fall down from a height of 1.8 m on a concrete floor 5 times at maximum.

In none of the bottles, cracking or peeling of the polyvinylidene chloride type resin coating from the bottle substrate (20PET) was observed.

EXAMPLE 16

The outer surface of an amorphous polyethylene terephthalate preform (bottomed parison) having an outer surface area of 130 cm$^2$, a weight of 62.5 g and an average thickness of 3.60 mm was coated with the polyvinylidene chloride type resin latex described in Example 14 according to the dip coating method so that the amount of the coating was 0.96 g as solids. The coated preform was dried at 70° C. for 5 minutes in an air-circulated oven. The preform was heated at 100° C. for 20 seconds and biaxially drawn and blow-molded by using a known biaxially drawing blow-molding machine to obtain a biaxially drawn polyethylene terephthalate bottle having an inner volume of 2000 cc and an average total thickness of about 0.50 mm, which had the outer surface coated with the polyvinylidene chloride type resin (the average thickness of the coating was 6.1μ). The so-obtained bottle is designated as bottle CRn. The bottle CRn was subjected to aging (heat treatment) in a thermostat tank maintained at 48° C. for 48 hours. The obtained bottle is designated as bottle CRa.

The PO$_2$ and PH$_2$O values of the so-obtained bottles CRn and CRa were determined according to the methods described hereinbefore.

The obtained results are shown in Table 7.

The carbon dioxide gas permeation constants (PCO$_2$) of the polyvinylidene chloride type resin coatings of the bottles CRn and CRa were determined according to the method described hereinbefore.

The obtained results are shown in Table 10.

TABLE 8

| Sample Mark | PCO$_2$[cc · cm/cm$^2$ · sec · cmHg] | |
|---|---|---|
| | 27° C., 0% RH | 27° C., 91% RH |
| CNn | 6.5 × 10$^{-13}$ | 6.6 × 10$^{-13}$ |
| CNa | 8.0 × 10$^{-14}$ | 8.0 × 10$^{-14}$ |
| 1 OPET | 1.2 × 10$^{-11}$ | 1.2 × 10$^{-11}$ |

TABLE 9

| Sample Mark | PCO$_2$[cc · cm/cm$^2$ · sec · cmHg] | |
|---|---|---|
| | 27° C., 0% RH | 27° C., 91% RH |
| CPn | 7.1 × 10$^{-13}$ | 7.2 × 10$^{-13}$ |
| CPa | 1.3 × 10$^{-13}$ | 1.3 × 10$^{-13}$ |
| 2 OPET | 1.2 × 10$^{-11}$ | 1.3 × 10$^{-11}$ |

TABLE 10

| Sample Mark | PCO$_2$[cc · cm/cm$^2$ · sec · cmHg] | |
|---|---|---|
| | 27° C., 0% RH | 27° C., 91% RH |
| CRn | 6.9 × 10$^{-13}$ | 6.9 × 10$^{-13}$ |
| CRa | 9.7 × 10$^{-14}$ | 9.7 × 10$^{-14}$ |

EXAMPLE 17

An angular, wide-mouthed bottle having a length of 9.7 cm, a width of 9.7 cm, a height of 3.2 cm and an average thickness of 0.47 mm was molded from an isotactic polypropylene sheet having a width of 30 cm and a thickness of 0.8 mm at a temperature of 148° C. according to the plug-assist air-pressure forming method.

The inner surface of the wide-mouthed bottle was coated with the anchoring agent described in Example 8 and the bottle was heat-treated at 100° C. for 30 seconds. Then, the bottle was coated with the polyvinylidene chloride resin type latex described in Example 14 according to the dip coating method and dried in an air-circulated oven maintained at 140° C. for 30 seconds. The average thickness of the polyvinylidene chloride type resin coating layer formed on the inner surface of the isotactic polypropylene bottle was 10μ. The so-obtained wide-mouthed bottle is designated as CYn. The bottle CYn was subjected to aging (heat treatment) in a thermostat tank maintained at 48° C. for 24 hours.

TABLE 7

| Example No. | Sample Mark | PO$_2$[cc · cm/cm$^2$ · sec · cmHg] | | PH$_2$O[g · cm/m$^2$ · day] (JIS Z-0208) |
|---|---|---|---|---|
| | | 20° C., 0% RH | 20° C., 100% RH | |
| 9 | CFn | 8.1 × 10$^{-14}$ | 8.1 × 10$^{-14}$ | 2.2 × 10$^{-3}$ |
| | CFa | 2.3 × 10$^{-14}$ | 2.3 × 10$^{-14}$ | 1.8 × 10$^{-3}$ |
| | PVC | 6.7 × 10$^{-13}$ | 6.7 × 10$^{-13}$ | 7.5 × 10$^{-2}$ |
| 10 | CGn | 3.6 × 10$^{-14}$ | 3.6 × 10$^{-14}$ | 1.7 × 10$^{-3}$ |
| | CGa | 1.1 × 10$^{-14}$ | 1.2 × 10$^{-14}$ | 0.95 × 10$^{-3}$ |
| | PC | 5.2 × 10$^{-12}$ | 5.5 × 10$^{-12}$ | 1.4 × 10$^{-1}$ |
| 11 | CHa | 1.9 × 10$^{-14}$ | 1.9 × 10$^{-14}$ | 1.6 × 10$^{-3}$ |
| | PMMA | 3.2 × 10$^{-12}$ | 3.6 × 10$^{-12}$ | 1.0 × 10$^{-1}$ |
| 12 | CJa | 6.1 × 10$^{-14}$ | 6.1 × 10$^{-14}$ | 2.3 × 10$^{-3}$ |
| | ABS | 3.2 × 10$^{-11}$ | 3.3 × 10$^{-11}$ | 1.8 × 10$^{-1}$ |
| Comparative Example 6 | CKa | 1.3 × 10$^{-13}$ | 1.3 × 10$^{-13}$ | 6.5 × 10$^{-3}$ |
| 13 | CLn | 7.0 × 10$^{-14}$ | 7.1 × 10$^{-14}$ | 2.7 × 10$^{-3}$ |
| | CLa | 1.8 × 10$^{-14}$ | 1.8 × 10$^{-14}$ | 1.0 × 10$^{-3}$ |
| | PS | 2.5 × 10$^{-11}$ | 2.7 × 10$^{-11}$ | 1.5 × 10$^{-1}$ |
| 14 | CNn | 4.1 × 10$^{-14}$ | 4.2 × 10$^{-14}$ | 1.2 × 10$^{-3}$ |
| | CNa | 1.5 × 10$^{-14}$ | 1.5 × 10$^{-14}$ | 0.96 × 10$^{-3}$ |
| | 1 OPET | 2.5 × 10$^{-13}$ | 2.6 × 10$^{-13}$ | 7.8 × 10$^{-2}$ |
| 15 | CPn | 4.8 × 10$^{-14}$ | 4.8 × 10$^{-14}$ | 1.8 × 10$^{-3}$ |
| | CPa | 2.6 × 10$^{-14}$ | 2.6 × 10$^{-14}$ | 1.1 × 10$^{-3}$ |
| | 2 OPET | 2.3 × 10$^{-13}$ | 2.5 × 10$^{-13}$ | 7.6 × 10$^{-2}$ |
| 16 | CRn | 4.5 × 10$^{-14}$ | 4.6 × 10$^{-14}$ | 1.1 × 10$^{-3}$ |
| | CRa | 2.1 × 10$^{-14}$ | 2.1 × 10$^{-14}$ | 0.99 × 10$^{-3}$ |

The so-obtained wide-mouthed bottle is designated as CYa.

Discs were cut out from the bottom portions of the so-obtained wide-mouthed bottles CYn and CYa and the uncoated polypropylene wide-mouthed bottle (designated as PP-WA) as a comparative bottle to obtain measurement samples. The $PO_2$ and $PH_2O$ values of these samples were determined according to the methods described hereinbefore.

The obtained results are shown in Table 11. From the results shown in Table 11, it will readily be understood that the oxygen permeation resistance and water permeation resistance of the coated bottle of the present invention can highly be improved by virtue of the barrier effect of the polyvinylidene chloride type resin, and that the barrier property of the vinylidene chloride type resin is further enhanced by the heat treatment.

EXAMPLE 18

The polyvinylidene chloride type resin latex described in Example 14 was brush-coated 4 times on one surface of a polyethylene terephthalate sheet having a width of 30 cm and a thickness of 1.5 mm, and the coated sheet was dried at 70° C. for 20 minutes in an air-circulated oven. The average thickness of the polyvinylidene chloride type resin coating was 28μ.

The coated sheet was subjected to plug-assist air-pressure forming at 107° C. so that the coated surface was located on the inner side, to obtain a wide-mouthed cylindrical bottle (the inner surface was coated with the polyvinylidene chloride type resin) having a diameter of 8.5 cm, a height of 10 cm and a total thickness of 0.42 mm (the thickness of the polyvinylidene chloride type resin coating was 8.0μ). The so-obtained bottle is designated as bottle CZn. The bottle CZn was subjected to aging (heat treatment) in a thermostat tank maintained at 40° C. for 5 days. The so-obtained wide-mouthed bottle is designated as bottle CZa.

Discs were cut out from the bottom portions of the so-obtained wide-mouthed bottles CZn and CZa and the uncoated polyethylene terephthalate wide-mouthed bottle (designated as PET-WN) as a comparative bottle to obtain measurement samples. The $PO_2$ and $PH_2O$ values of these samples were determined according to the methods described hereinbefore.

The obtained results are shown in Table 11. Tendencies similar to those observed in Example 17 are seen from Table 11.

EXAMPLE 19

A cylindrical wide-mouthed bottle of a double-layer structure having a diameter (inner diameter) of 7.0 cm and a height of 10 cm was prepared by using an apparatus disclosed in Japanese Patent Application Laid-Open Specification No. 24110/81 according to a method disclosed in said Japanese Patent Publication. The outer layer of this wide-mouthed bottle was formed of a mixture comprising 100 parts by weight of isotactic polypropylene having a melt index of 6.5 g/10 min (ASTM D-1238) and 80 parts by weight of calcium carbonate, and the inner layer of the bottle was formed of a mixture comprising 100 parts by weight of high density polyethylene having a melt index of 0.5 g/10 min (ASTM D-1238) and 40 parts by weight of natural phologopite having a specific surface area of about 400 m²/g. The thickness of the outer layer was 0.4 mm and the thickness of the inner layer was 0.4 mm.

The outer surface of the so-obtained wide-mouthed bottle was coated with the polyvinylidene chloride type resin latex described in Example 14 according to the dip coating method, and the coated bottle was dried in an air-circulated oven maintained at 100° C. for 2 minutes. The average thickness of the polyvinylidene chloride type coating layer formed on the outer surface of the outer layer (the isotactic polypropylene mixture layer) of the above-mentioned two-layer structure was 24μ. The so-obtained wide-mouthed bottle is designated as bottle CQYn. The bottle CQYn was subjected to aging (heat treatment) in a thermostat tank maintained at 60° C. for 24 hours. The so-obtained wide-mouthed bottle is designated as bottle CQYa.

Discs were cut out from the bottom portions of the so-obtained wide-mouthed bottles CQYn and CQYa and the uncoated double-layer wide-mouthed bottle (designated as QY-TM) as a comparative bottle to obtain measurement samples. The $PO_2$ and $PH_2O$ values of these samples were determined according to the methods described hereinbefore.

The obtained results are shown in Table 12. Tendencies similar to those observed in Example 17 are seen from Table 12.

TABLE 12

| Example No. | Sample Mark | $PO_2$[cc · cm/cm² · sec · cmHg] 20° C., 0% RH | 20° C., 100% RH | $PH_2O$[g · cm/m² · day] (JIS Z-0208) |
|---|---|---|---|---|
| 19 | CQYn | $2.8 \times 10^{-14}$ | $2.9 \times 10^{-14}$ | $2.2 \times 10^{-3}$ |
|  | CQYa | $1.1 \times 10^{-14}$ | $1.2 \times 10^{-14}$ | $1.3 \times 10^{-3}$ |
|  | QY-TM | $3.9 \times 10^{-12}$ | $4.2 \times 10^{-12}$ | $4.7 \times 10^{-2}$ |

What we claim is:

1. A process for the preparation of coated plastic bottles which excel in both oxygen-barrier property and water resistance, which comprises coating at least one surface of a plastic bottle-forming parison, preform or sheet formed of a thermoplastic resin by melt molding with an aqueous latex of a copolymer consisting essen-

TABLE 11

| Example No. | Sample Mark | $PO_2$[cc · cm/cm² · sec · cmHg] 20° C., 0% RH | 20° C., 100% RH | $PH_2O$[g · cm/m² · day] (JIS Z-0208) |
|---|---|---|---|---|
| 17 | CYn | $3.7 \times 10^{-14}$ | $3.8 \times 10^{-14}$ | $1.4 \times 10^{-3}$ |
|  | CYa | $1.6 \times 10^{-14}$ | $1.6 \times 10^{-14}$ | $1.0 \times 10^{-3}$ |
|  | PP-WM | $4.4 \times 10^{-12}$ | $4.4 \times 10^{-12}$ | $1.8 \times 10^{-2}$ |
| 18 | CZn | $4.9 \times 10^{-14}$ | $5.0 \times 10^{-14}$ | $2.0 \times 10^{-3}$ |
|  | CZa | $2.8 \times 10^{-14}$ | $2.8 \times 10^{-14}$ | $1.2 \times 10^{-3}$ |
|  | PET-WM | $2.4 \times 10^{-13}$ | $2.5 \times 10^{-13}$ | $7.7 \times 10^{-2}$ | tially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers, said copolymer having an oxygen permeability constant of less than $9 \times 10^{-14}$ cc·cm/cm$^2$·sec·cmHg as measured at a temperature of 20° C. and a relative humidity of 100% and a water vapor permeability constant of less than $3 \times 10^{13}$ g·cm/m$^2$·day as determined according to the method of JIS Z-0208, drying the coated parison, preform or sheet to form a coating layer, subjecting the so-formed coated structure to biaxially drawing blow molding or deep forming to introduce monoaxial or biaxial orientation in said plastic substrate, and then increasing the oxygen-barrier property and water resistance of the coated plastic bottle by subjecting the resultant bottle to aging at a temperature of 30° to 120° C. for 30 seconds to 7 days.

2. A process for the preparation of plastic bottles according to claim 1, wherein said copolymer consists essentially of 96 to 75% by weight of vinylidene chloride and 4 to 25% by weight of at least one acrylic or methacrylic monomer and further including up to 50 parts by weight of at least one member selected from other ethylenically unsaturated monomers per 100 parts by weight of the total amount of said two monomers.

3. A process for the preparation of plastic bottles according to claim 1, wherein said acrylic or methacrylic monomer is a monomer represented by the following formula:

$$CH_2 = \overset{\overset{R_1}{|}}{\underset{\underset{X}{|}}{C}}$$

wherein $R_1$ stands for a hydrogen atom, a halogen atom or a methyl group, and X stands for a nitrile group (—C≡N) or a group $$-\overset{\overset{}{}}{\underset{\underset{O}{\|}}{C}}-Y$$

in which Y stands for an amino group, a hydroxyl group, alkyloxy group, a cycloalkyloxy group, an aminoalkyloxy group, a hydroxylalkyloxy group, an alkoxyalkyloxy group, a haloalkyloxy group, a glycidyl group, an aryloxy group or an aralkyloxy group.

4. A process for the preparation of plastic bottles according to claim 1, wherein said copolymer further comprises a monomer represented by the following formula:

$$CH_2=\overset{\overset{R_1}{|}}{\underset{\underset{O}{\overset{\|}{C}}}{C}}-O-CH_2-\overset{\overset{}{|}}{\underset{\underset{R_2}{|}}{CH}}-\overset{\overset{}{|}}{\underset{\underset{R_3}{|}}{CH_2}}$$

wherein $R_1$ stands for a hydrogen atom, a halogen atom or a methyl group, and $R_2$ and $R_3$ each stand for a hydroxyl group and these two hydroxyl groups may be dehydrated to form an oxirane ring.

5. A process for the preparation of plastic bottles according to claim 1, wherein said copolymer is a vinylidene chloride/alkoxyalkyl acrylate or methacrylate/alkyl acrylate or methacrylate/trichloroethylene copolymer.

6. A process for the preparation of plastic bottles according to claim 1, wherein the plastic bottle substrate is formed of polyethylene terephthalate or polypropylene.

7. The process of claim 1 wherein the resultant bottle is subjected to aging at a temperature of about 30° C. for about 7 days.

8. The process of claim 1 wherein the resultant bottle is subjected to aging at a temperature of from about 40° C. to about 48° C. for from about 24 hours to about 5 days.

9. The process of claim 1 wherein the resultant bottle is subjected to aging at a temperature of about 60° C. for from about 6 hours to about 24 hours.

* * * * *

REEXAMINATION CERTIFICATE (1320th)
United States Patent [19]

Hirata et al.

[11] B1 4,486,378
[45] Certificate Issued  Jul. 3, 1990

[54] PLASTIC BOTTLES AND PROCESS FOR PREPARATION THEREOF

[75] Inventors: Sadao Hirata, Yokohama; Isao Tanikawa, Ayase; Yoshitsugu Maruhashi, Yokohama, all of Japan

[73] Assignee: Toyo Seikan Kaisha, Ltd., Japan

Reexamination Request:
No. 90/000,838, Aug. 19, 1985

Reexamination Certificate for:
Patent No.: 4,486,378
Issued: Dec. 4, 1984
Appl. No.: 598,543
Filed: Apr. 12, 1984

Related U.S. Application Data

[60] Continuation of Ser. No. 386,039, Jun. 7, 1981, abandoned, which is a division of Ser. No. 258,772, Apr. 29, 1981, Pat. No. 4,370,368.

[30] Foreign Application Priority Data

May 7, 1980 [JP] Japan ................................. 55-59505
May 7, 1980 [JP] Japan ................................. 55-59506

[51] Int. Cl.$^5$ ............................................. B29D 9/04
[52] U.S. Cl. ................................. 264/512; 264/134; 264/235; 264/516
[58] Field of Search ............. 215/1 C, 12 R; 264/134, 264/512, 513, 516; 428/35

[56] References Cited

U.S. PATENT DOCUMENTS

| | | |
|---|---|---|
| 2,897,100 | 7/1959 | Grenley et al. |
| 2,985,542 | 5/1961 | Pinsky et al. |
| 3,134,684 | 5/1964 | Northrop et al. |
| 3,313,757 | 4/1967 | Trofimow et al. |
| 3,322,614 | 5/1967 | Seiferth et al. |
| 3,328,196 | 6/1967 | Sincock |
| 3,353,991 | 11/1967 | Shelburg et al. |
| 3,353,992 | 11/1967 | Grenley et al. |
| 3,380,844 | 4/1968 | Menikheim et al. |
| 3,438,788 | 4/1969 | Gifford et al. |
| 3,449,479 | 6/1969 | Cines |
| 3,468,703 | 9/1969 | Gibbs et al. |
| 3,468,994 | 9/1969 | Gilbert |
| 3,557,041 | 1/1971 | Loshaek et al. |
| 3,589,506 | 6/1971 | Ford et al. |
| 3,661,677 | 5/1972 | Wang |
| 3,723,168 | 3/1973 | Utz et al. |
| 3,746,196 | 7/1973 | Sako et al. |
| 3,804,663 | 4/1974 | Clark |
| 3,850,671 | 11/1974 | Petty et al. |
| 3,922,451 | 11/1975 | Anschutz et al. |
| 4,041,235 | 8/1977 | Suzuki et al. |
| 4,127,633 | 11/1978 | Addleman |
| 4,254,170 | 3/1981 | Roullet et al. |

FOREIGN PATENT DOCUMENTS

| | | |
|---|---|---|
| 2404512 | 8/1975 | Fed. Rep. of Germany |
| 49-13627 | 4/1974 | Japan |
| 2014160 | 8/1979 | United Kingdom |

*Primary Examiner*—James J. Bell

[57] ABSTRACT

A plastic bottle has as a wall-forming component a layer of a copolymer consisting essentially of 99 to 70% by weight of vinylidene chloride and 1 to 40% by weight of at least one acrylic or methacrylic monomer and further including up to 100 parts by weight of at least one member selected from other ethylenically unsaturated monomers per 100 parts by weight of the total amount of the first two monomers, the copolymer having an oxygen permeability constant of less than $9 \times 10^{-14}$ cc·cm/cm$^2$·sec·cmHg as measured at a temperature of 20° C. and a relative humidity of 100% and a water vapor permeability constant of less than $3 \times 10^{-3}$ g·cm/m$^2$·day as determined according to the method of JIS Z-0208.

This plastic bottle is obtained by casting an aqueous latex or the like of the above-mentioned copolymer in a bottle mold and drying the cast latex. This aqueous latex may be formed as a coating layer on a preformed plastic bottle. In this plastic bottle, the humidity dependency of the oxygen barrier property is prominently reduced.

REEXAMINATION CERTIFICATE ISSUED UNDER 35 U.S.C. 307

THE PATENT IS HEREBY AMENDED AS INCIDATED BELOW.

ONLY THOSE PARAGRAPHS OF THE SPECIFICATION AFFECTED BY AMENDMENT ARE PRINTED HEREIN.

Column 10, fourth full paragraph (lines 33-38):

The effect of shutting a gas or perfume can be attained sufficiently by the above-mentioned drying operation alone, but the effect is further enhanced if an aging treatment (heat treatment) is carried out at a temperature of 30° to 120° C. for 30 seconds to 7 days after the drying operation, if desired, *whereby, as seen from the following examples, the aged vinylidene chloride copolymer coating of the bottle after aging has an oxygen permeability constant of from 1.2 to $6.1 \times 10^{-14}$ cc·cm·cm$^2$·sec·cmHg as measured at a temperature of 20° C. and a relative humidity of 100% and a water vapor permeability constant of from 0.95 to $2.4 \times 10^{-3}$ g·cm/m$^2$·day as determined according to the method of JIS Z-0208.*

Column 24, after Table 12, insert the following:

*The data in Tables 7, 11 and 12 reveals that dried coated bottles subjected to a heat-treatment (aging) according to the invention, such as 30° C. for 7 days (Example 12), 40° to 48° C. for 24 hours to 5 days (Examples 9, 10 and 14–18), or 60°–61° C. for 6 hours to 24 hours (Examples 11, 13 and 19), have improved PO$_2$ and PH$_2$O values as compared to uncoated bottles and as compared to coated bottles not subjected to heat-treatment. For instance, at heat treatment temperatures of 40° or 48° C. PO$_2$ values at 20° C. and 100% RH range from 1.2 to $2.8 \times 10^{-14}$ cc·cm/cm$^2$·sec·cmHg and PH$_2$O values range from 0.95 to 1.8 g·cm/m$^2$·day, while at about 60° C. the corresponding values for PO$_2$ and PH$_2$O range from 1.2 to $1.9 \times 10^{-14}$ cc·cm/cm$^2$·sec·cmHg and from 1.0 to $1.6 \times 10^{-3}$ g·cm/m$^2$·day, respectively.*

AS A RESULT OF REEXAMINATION, IT HAS BEEN DETERMINED THAT:

Claims 1-9 are cancelled.

* * * * *